United States Patent
Kato et al.

(10) Patent No.: US 8,186,771 B2
(45) Date of Patent: May 29, 2012

(54) STROKE SIMULATOR IN BRAKE SYSTEM

(75) Inventors: Masaie Kato, Wako (JP); Kazuya Takenouchi, Wako (JP); Yutaka Nishikawa, Wako (JP); Masatsugu Nishimura, Wako (JP); Kazuhiko Tani, Wako (JP); Yoko Uno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 12/566,266

(22) Filed: Sep. 24, 2009

(65) Prior Publication Data
US 2010/0078989 A1    Apr. 1, 2010

(30) Foreign Application Priority Data

Sep. 30, 2008  (JP) .................................. 2008-253732

(51) Int. Cl.
*B60T 13/74* (2006.01)
(52) U.S. Cl. .................................. 303/113.4; 303/114.1
(58) Field of Classification Search .................. 188/377; 267/139, 140, 152, 153; 248/634; 60/552–554; 303/9.61–9.75, 113.4, 114.1

See application file for complete search history.

(56) References Cited

U.S. PATENT DOCUMENTS

| 5,729,979 A * | 3/1998 | Shaw et al. ..................... 60/533 |
| 6,202,995 B1 * | 3/2001 | Jou ................................. 267/293 |
| 7,354,116 B2 * | 4/2008 | Kusano ..................... 303/113.4 |
| 2002/0063369 A1 * | 5/2002 | Huang ......................... 267/153 |
| 2005/0001476 A1 * | 1/2005 | Kusano ..................... 303/113.4 |
| 2005/0121973 A1 * | 6/2005 | Matsuno et al. ........... 303/114.1 |

FOREIGN PATENT DOCUMENTS

| EP | 1103436 A2 | 5/2001 |
| EP | 1847430 A1 | 10/2007 |
| JP | 2005-162127 A | 6/2005 |
| JP | 2006-256408 A | 9/2006 |

* cited by examiner

*Primary Examiner* — Christopher Schwartz
(74) *Attorney, Agent, or Firm* — Westerman, Hattori, Daniels & Adrian, LLP

(57) ABSTRACT

A stroke simulator in a brake system includes a cylinder body, a piston movably inserted in the cylinder body, and a second elastic member adapted to be pressed by the piston. It functions to give a simulative operational feel to a brake lever by operating the brake lever to generate a fluid pressure in a front wheel master cylinder and transmit this fluid pressure to the cylinder body, thereby deforming the second elastic member through the piston, and wherein annular recesses are formed on the outer circumferential surface of the second elastic member.

12 Claims, 8 Drawing Sheets

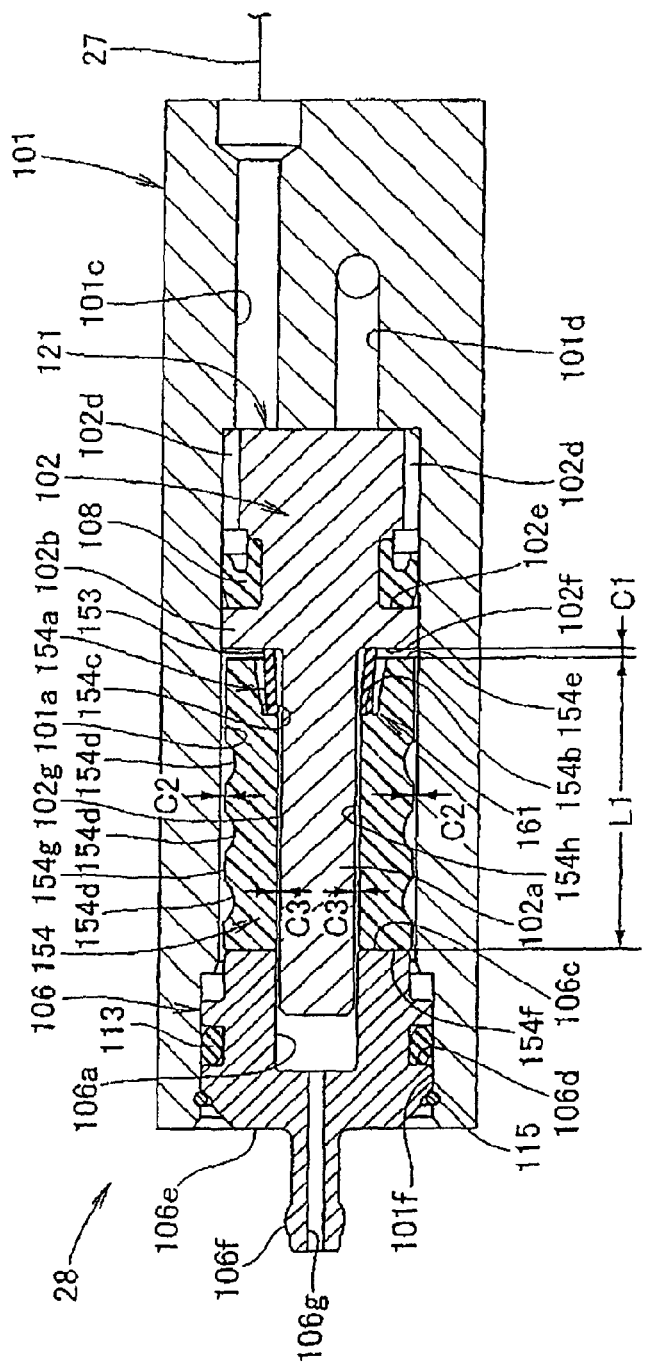
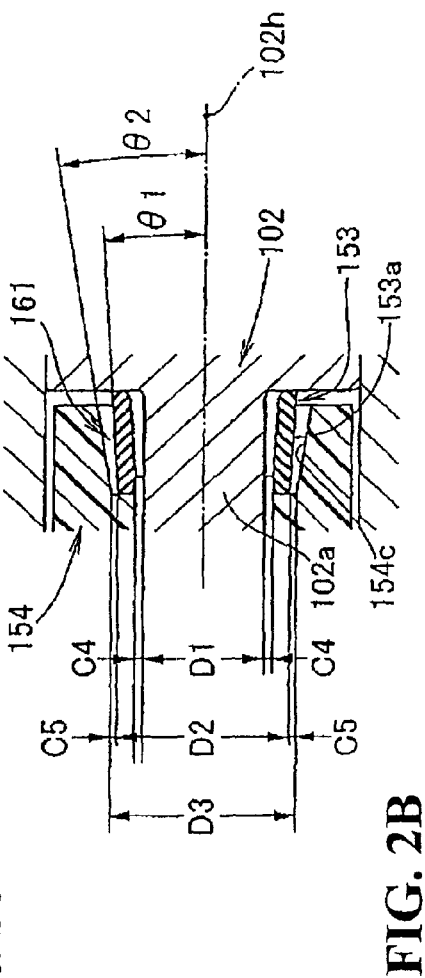
FIG. 2A
FIG. 2B

STROKE SIMULATOR IN BRAKE SYSTEM

TECHNICAL FIELD

The present invention relates to an improvement in a stroke simulator in a brake system.

BACKGROUND OF THE INVENTION

Conventionally known is a stroke simulator in a brake system for giving a simulative operation feel to a brake operation member by operating the brake operation member to compress an elastic member. See Patent Document 1 for example, Japanese Patent Laid-Open No. 2005-162127, incorporated herein by reference.

In FIG. 6 of Patent Document 1, there is shown a stroke simulator 14 including a control piston 90 having a cylindrical shape with a bottom, an intermediate transmitting member 171 provided at the bottom of the control piston 90 through a coil spring 168, an elastic member 167 having one end abutting against the intermediate transmitting member 171, and an input piston 166 abutting against the other end of the elastic member 167 and movably inserted in the control piston 90, the input piston 166 being connected to an input rod 170 provided on a side of a brake pedal as a brake operation member.

When the brake pedal is depressed, the elastic member 167 provided between the intermediate transmitting member 171 and the input piston 166 is compressed to give a simulative reaction force to the brake pedal.

A clearance is defined between the inner circumferential surface of the control piston 90 and the outer circumferential surface of the elastic member 167. In the case of increasing the simulative reaction force on the brake pedal to thereby obtain a hard operation feel, the clearance mentioned above may be reduced. Accordingly, the elastic member 167 comes into contact with the control piston 90 in an early stage of the stroke of the input piston 166, so that a hard operation feel on the brake pedal can be obtained.

However, after the outer circumferential surface of the elastic member 167 comes into contact with the whole of the inner circumferential surface of the control piston 90, the compression of the elastic member 167 is rapidly suppressed. As a result, the stroke of the input piston 166 is reduced and it is therefore difficult to ensure a predetermined stroke of the brake pedal.

SUMMARY OF THE INVENTION

A stroke simulator in a brake system can make the operation feel on a brake operation member moderately hard and can also ensure the stroke of the brake operation member.

A stroke simulator in a brake system includes a cylinder body, a piston movably inserted in the cylinder body, and an elastic member adapted to be pressed by the piston. It functions to give a simulative operation feel to a brake operation member by operating the brake operation member to generate a fluid pressure in a master cylinder and transmit this fluid pressure to the cylinder body, thereby deforming the elastic member through the piston, wherein an outer circumferential recess is formed on the outer circumferential surface of the elastic member.

When the elastic member is pressed by the piston, the outer circumferential surface of the elastic member comes into contact with the inner circumferential surface of the cylinder body, and the elastic member is gradually compressed. Thereafter, when the whole of the outer circumferential surface of the elastic member comes into contact with the inner circumferential surface of the cylinder body, the spring constant of the elastic member is increased to make the operation feel on the brake operation member moderately hard. Even in this condition, the inner surface of the outer circumferential recess is allowed to be deformed in the radially outward direction of the elastic member, so that the elastic member can continue to be compressed. Accordingly, the piston can be further moved, thereby increasing the stroke of the brake operation member.

The outer circumferential recess is provided by an annular recess annularly formed on the outer circumferential surface of the elastic member.

The inner surface of the outer circumferential recess formed annularly is deformed in the radially outward direction of the elastic member in such a manner that the deformation is made uniform in the circumferential direction of the elastic member. Accordingly, during compression of the elastic member, it can be stably deformed.

The elastic member has a hollow cylindrical shape; the piston includes a large-diameter portion slidably fitted to the inner surface of the cylinder body and a small-diameter portion formed adjacent to the large-diameter portion; the small-diameter portion is inserted in a hollow portion of the elastic member; one end of the elastic member opposed to the piston is formed with an annular shoulder portion on the inner circumferential surface, thereby forming an end recess between the annular shoulder portion and the outer circumferential surface of the small-diameter portion of the piston; a compact elastic member having a spring constant smaller than that of the elastic member is accommodated in the end recess; and the outer circumferential recess is formed on the outer circumferential surface of the elastic member except a part thereof corresponding to the radially outside area of the end recess.

The outer circumferential recess is formed on the outer circumferential surface of the elastic member except a part thereof corresponding to the radially outside area of the end recess. Accordingly, the deformation of the radially outside area of the end recess can be suppressed, so that the operation feel on the brake operation member can be set minutely by the compact elastic member, thereby easily obtaining a desirable operation feel on the brake operation member.

A clearance is defined between the small-diameter portion of the piston and the hollow portion of the elastic member.

When the elastic member is pressed by the piston moved by inputting an operational force to the brake operation member, and the operational force is thereafter removed from the brake operation member, the elastic member deformed is returned to its initial condition. Since the clearance is defined between the small-diameter portion of the piston and the hollow portion of the elastic member in the initial condition, the piston can be easily separated from the elastic member in the above operation, so that the piston can be easily returned.

The outer circumferential recess is formed on the outer circumferential surface of the elastic member. With this arrangement, the elastic member is pressed by the piston to increase in diameter in the cylinder body, so that the outer circumferential surface of the elastic member comes into contact with the inner circumferential surface of the cylinder body to thereby increase the spring constant of the elastic member. Furthermore, the inner surface of the outer circumferential recess is deformed in the radially outward direction of the elastic member to thereby allow a further movement of the piston, resulting in an increase in stroke of the brake operation member. Accordingly, the operation feel on the brake operation member can be made moderately hard and the stroke of the brake operation member can also be ensured.

The outer circumferential recess is provided by the annular recess annularly formed on the outer circumferential surface of the elastic member. Accordingly, the elastic member can be deformed uniformly in the circumferential direction thereof, so that the stroke characteristic of the elastic member can be made more stable.

The elastic member has a hollow cylindrical shape. The piston includes the large-diameter portion slidably fitted to the inner surface of the cylinder body and the small-diameter portion formed adjacent to the large-diameter portion. The small-diameter portion is inserted in the hollow portion of the elastic member. One end of the elastic member opposed to the piston is formed with the annular shoulder portion on the inner circumferential surface, thereby forming the end recess between the annular shoulder portion and the outer circumferential surface of the small-diameter portion of the piston. The compact elastic member having a spring constant smaller than that of the elastic member is accommodated in this end recess. The outer circumferential recess is formed on the outer circumferential surface of the elastic member except a part thereof corresponding to the radially outside area of the end recess. Thus, the outer circumferential recess is not formed around the end recess, so that the deformation of the compact elastic member is not influenced by the outer circumferential recess. Accordingly, the operation feel on the brake operation member can be set more minutely, thereby obtaining a desirable operation feel on the brake operation member.

The clearance is defined between the small-diameter portion of the piston and the hollow portion of the elastic member. With this arrangement, in inputting an operational force to the brake operation member and thereafter removing this operational force from the brake operation member, the piston can be easily returned to its initial position owing to the clearance defined between the piston and the elastic member. Accordingly, the piston can quickly respond to the next input to the brake operation member.

BRIEF DESCRIPTION OF THE DRAWINGS

The above and other features and advantages of embodiments of the present invention will become more apparent by describing in detail exemplary embodiments thereof with reference to the attached drawings in which:

FIGS. 2A and 2B are sectional views of a stroke simulator for a front wheel brake system according to the present invention;

DETAILED DESCRIPTION

Figure 1:
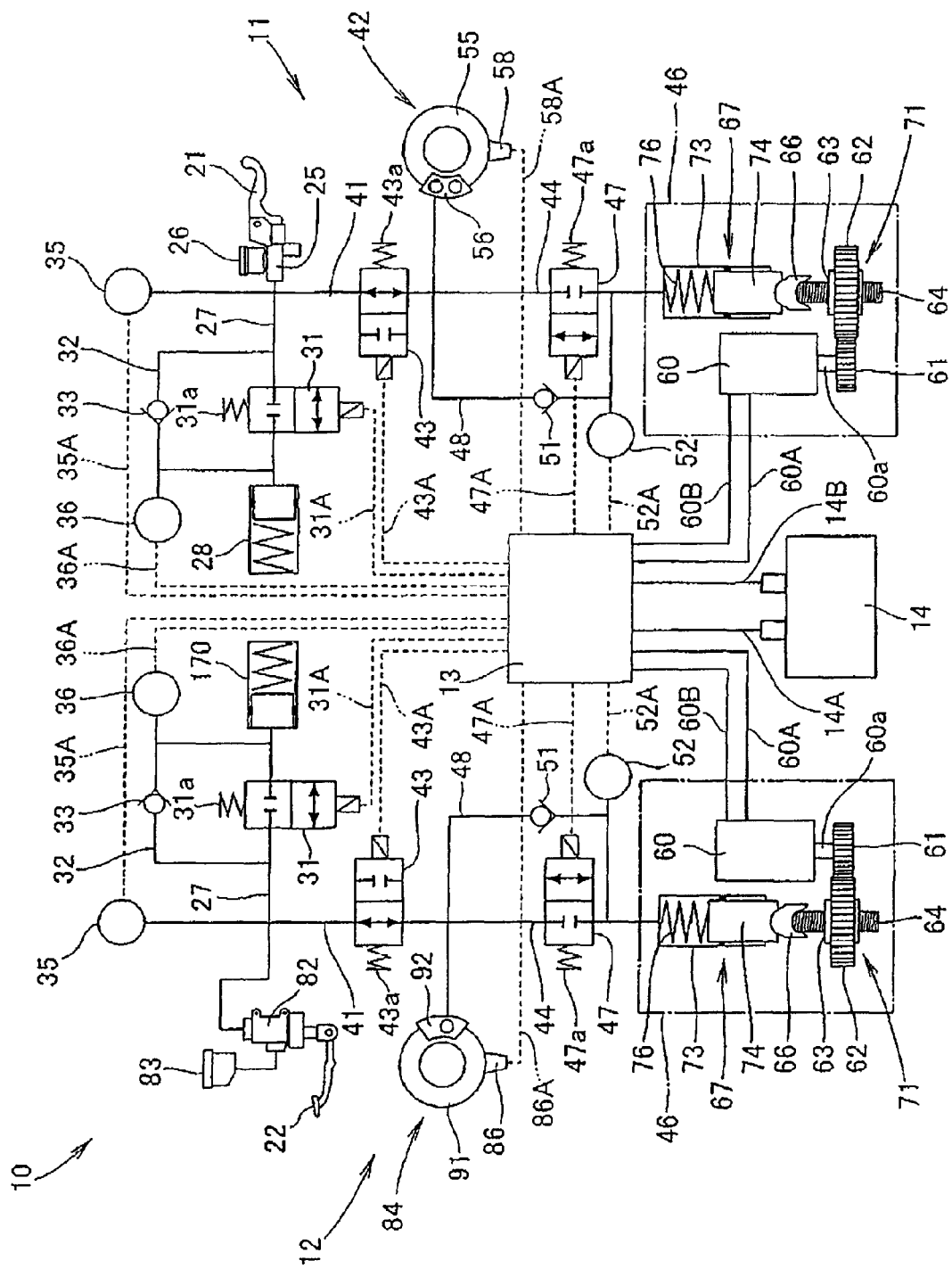
FIG. 1 is a schematic diagram of a brake system for a motorcycle according to the present invention.

The orientation of each drawing is the same as that of the reference numerals included therein.

FIG. 1 is a schematic diagram of a brake system for a motorcycle according to the present invention.

The brake system 10 includes a front wheel brake system 11 for braking a front wheel of the motorcycle, a rear wheel brake system 12 for braking a rear wheel of the motorcycle, a control unit 13 for controlling the opening/closing operation of a plurality of electromagnetic valves provided in brake fluid passages included in the front wheel brake system 11 and the rear wheel brake system 12, and a battery 14 for supplying electric power to the front wheel brake system 11, the rear wheel brake system 12, and the control unit 13. This brake system 10 is a by-wire type such that the operational amounts of a brake lever 21 included in the front wheel brake system 11 and a brake pedal 22 included in the rear wheel brake system 12 are electrically detected and brake fluid pressures are generated according to the detected operational amounts of the brake lever 21 and the brake pedal 22 to thereby brake the front wheel and the rear wheel individually or cooperatively.

The front wheel brake system 11 includes the brake lever 21, a front wheel master cylinder 25 connected to the brake lever 21 for generating a brake fluid pressure by the operation of the brake lever 21, a reservoir tank 26 for storing a brake fluid flowing into/out of the front wheel master cylinder 25, a stroke simulator 28 connected through a brake pipe 27 to the front wheel master cylinder 25, a first electromagnetic valve 31 provided in the middle of the brake pipe 27, a bypass pipe 32 connected to the brake pipe 27 so as to bypass the first electromagnetic valve 31, a one-way valve 33 provided in the middle of the bypass pipe 32, a first pressure sensor 35 connected to the front wheel master cylinder 25, a second pressure sensor 36 connected to the bypass pipe 32, a front wheel disc brake device 42 connected through a brake pipe 41 to the brake pipe 27, a second electromagnetic valve 43 provided in the middle of the brake pipe 41, a power unit 46 connected through a brake pipe 44 to the brake pipe 41, a third electromagnetic valve 47 provided in the middle of the brake pipe 44, a bypass pipe 48 connected to the brake pipe 44 so as to bypass the third electromagnetic valve 47, a one-way valve 51 provided in the middle of the bypass pipe 48, and a third pressure sensor 52 connected to the bypass pipe 48. Reference numerals 14A and 14B denote conductors for connecting the control unit 13 and the battery 14.

The stroke simulator 28 functions to generate a simulative reaction force using a fluid pressure generated in the front wheel master cylinder 25 according to the operational amount of the brake lever 21, thereby giving the operator's hand operating the brake lever 21 an operational feel such as a play similar to that generated on a brake lever in a normal hydraulic brake system rather than a by-wire type brake system.

The first electromagnetic valve 31 is a component normally closed by an elastic force of a compression coil spring 31a. When receiving a control signal output from the control unit 13 through a conductor 31A, the first electromagnetic valve 31 is opened against the elastic force of the compression coil spring 31a.

The bypass pipe 32 and the one-way valve 33 function to relieve a residual brake fluid pressure generated in the stroke simulator 28. The one-way valve 33 is a component allowing the flow of the brake fluid in only one direction from the stroke simulator 28 to the front wheel master cylinder 25.

The first pressure sensor 35 is a component for detecting a fluid pressure in the front wheel master cylinder 25 through the brake pipe 27. The first pressure sensor 35 is connected through a conductor 35A to the control unit 13.

The second pressure sensor 36 is a component for detecting a fluid pressure in the stroke simulator 28 through the bypass pipe 32. The second pressure sensor 36 is connected through a conductor 36A to the control unit 13.

The front wheel disc brake device 42 includes a brake disc 55 and a brake caliper 56 for braking the brake disc 55. The brake caliper 56 is connected to the brake pipe 41. Reference numeral 58 denotes a front wheel speed sensor for detecting the rotational speed of the brake disc 55 to thereby obtain a front wheel speed. The front wheel speed sensor 58 is connected through a conductor 58A to the control unit 13.

The second electromagnetic valve 43 is a component normally opened by an elastic force of a compression coil spring 43a. When receiving a control signal output from the control unit 13 through a conductor 43A, the second electromagnetic valve 43 is closed against the elastic force of the compression coil spring 43a.

The power unit 46 includes an electric motor 60, a first gear 61 mounted on a rotating shaft 60a of the electric motor 60, a second gear 62 meshing with the first gear 61, a nut member 63 integrally mounted on the second gear 62, a screw shaft 64 threadedly engaged with the nut member 63 through a plurality of balls (not shown), and a power cylinder device 67 pressed on the screw shaft 64 through a pressure member 66. Reference numerals 60A and 60B denote conductors for connecting the control unit 13 and the electric motor 60 to supply a current to the electric motor 60.

The nut member 63, the plurality of balls, and the screw shaft 64 constitute a ball screw mechanism 71.

The power cylinder device 67 includes a cylinder body 73, a power piston 74 movably inserted in the cylinder body 73 and having one end abutting against the pressure member 66, and a compression coil spring 76 provided between the other end of the power piston 74 and the bottom of the cylinder body 73. The brake pipe 44 is connected to the bottom of the cylinder body 74.

The third electromagnetic valve 47 is a component normally closed by an elastic force of a compression coil spring 47a. When receiving a control signal output from the control unit 13 through a conductor 47A, the third electromagnetic valve 47 is opened against the elastic force of the compression coil spring 47a.

The bypass pipe 48 and the one-way valve 51 function to relieve a residual brake fluid pressure generated in the cylinder body 73 of the power unit 46. The one-way valve 51 is a component allowing the flow of the brake fluid in only one direction from the power unit 46 to the brake caliper 56.

The third pressure sensor 52 is a component for detecting a fluid pressure in the cylinder body 73. The third pressure sensor 52 is connected through a conductor 52A to the control unit 13.

The control unit 13 controls the opening/closing operation of the first electromagnetic valve 31, the second electromagnetic valve 43, and the third electromagnetic valve 47 and also controls the driving operation of the electric motor 60 according to the pressure signals from the first pressure sensor 35, the second pressure sensor 36, and the third pressure sensor 52 and according to the front wheel speed signal from the front wheel speed sensor 58.

The rear wheel brake system 12 has the same basic configuration as that of the front wheel brake system 11 except that a brake pedal 22 is substituted for the brake lever 21, a rear wheel master cylinder 82 is substituted for the front wheel master cylinder 25, a reservoir tank 83 is substituted for the reservoir tank 26, a stroke simulator 170 is substituted for the stroke simulator 28, a rear wheel disc brake device 84 is substituted for the front wheel disc brake device 42, a rear wheel speed sensor 86 is substituted for the front wheel speed sensor 58, and a conductor 86A is substituted for the conductor 58A. The other parts of the rear wheel brake system 12 are denoted by the same reference numerals as those denoting the corresponding parts of the front wheel brake system 11.

The rear wheel disc brake device 84 includes a brake disc 91 and a brake caliper 92 for braking the brake disc 91. The brake caliper 92 is connected to the brake pipe 41.

The rear wheel speed sensor 86 is a component for detecting the rotational speed of the brake disc 91, i.e., detecting a rear wheel speed. The rear wheel speed sensor 86 is connected through the conductor 86A to the control unit 13.

FIGS. 2A and 2B are sectional views of the stroke simulator for the front wheel brake system according to the present invention.

FIG. 2A is an overall sectional view of the stroke simulator 28 for the front wheel brake system 11 (see FIG. 1). As shown in FIG. 2A, the stroke simulator 28 includes a cylinder body 101 having a cylinder hole 101a, a piston 102 movably inserted in the cylinder hole 101a and having a small-diameter portion 102a, a first elastic member 153 loosely engaged with the small-diameter portion 102a at its base end with a radial clearance defined therebetween, the first elastic member 153 being formed of rubber, a second elastic member 154 loosely engaged with the small-diameter portion 102a and loosely inserted in the cylinder hole 101a, the second elastic member 154 having an annular shoulder portion 154a at one end thereof for accommodating a part of the first elastic member 153, and an end closing member 106 for closing one end of the cylinder hole 101a, the end closing member 106 having a hollow portion 106a for movably accommodating the small-diameter portion 102a.

The cylinder body 101 is formed with a brake fluid passage 101c having one end connected to the brake pipe 27 and the other end communicating with the cylinder hole 101a. The cylinder body 101 is further formed with a relief passage 101d for relieving extra brake fluid in filling the cylinder hole 101a with a brake fluid.

The piston 102 is composed of a large-diameter portion 102b slidably fitted to the cylinder hole 101a and a small-diameter portion 102a formed integrally with the large-diameter portion 102b at its one end. The outer circumferential surface of the large-diameter portion 102b is formed with a plurality of axial grooves 102d extending in the axial direction of the piston 102 and communicating with a fluid chamber 121 defined between one end of the cylinder hole 101a and one end of the piston 102. The outer circumferential surface of the large-diameter portion 102b is further formed with an annular groove 102e for mounting a sealing member 108 for sealing the gap between the cylinder hole 101a and the large-diameter portion 102b.

The first elastic member 153 is formed of rubber and has a tapering cylindrical shape. One end of the first elastic member 153 abuts against an end surface 102f of the large-diameter portion 102b, and the other end of the first elastic member 153 abuts against a bottom surface 154b of the shoulder portion 154a (annular recess 161 to be hereinafter described) of the second elastic member 154. Thus, the first elastic member 153 is axially confined between the large-diameter portion 102b and the shoulder portion 154a.

The shoulder portion 154a is an annular recessed portion composed of the bottom surface 154b and an inner circumferential surface 154c.

The second elastic member 154 is formed of rubber (EPDM) or resin having a spring constant larger than that of the first elastic member 153. The second elastic member 154 is interposed between the piston 102 and the end closing member 106 in series with the first elastic member 153. The second elastic member 154 has an outer circumferential surface 154g formed with a plurality of annular recesses 154d. The annular shoulder portion 154a is formed at one end of the second elastic member 154. The second elastic member 154 is further formed with a hollow portion 154h for insertion of the small-diameter portion 102a.

The inner circumferential surface 154c of the shoulder portion 154a of the second elastic member 154 is tapered toward the end closing member 106. An annular recess 161 is formed by the annular shoulder portion 154a and an outer circumferential surface 102g of the small-diameter portion 102a of the piston 102. A part of the first elastic member 153 is accommodated in this annular recess 161.

Reference symbol C1 denotes the clearance between the end surface 102f of the large-diameter portion 102b and one end surface 154e of the second elastic member 154. Reference symbol C2 denotes the clearance between the outer circumferential surface 154g of the second elastic member 154 and the cylinder hole 101a. Reference symbol C3 denotes the clearance between the outer circumferential surface 102g of the small-diameter portion 102a and the inner circumferential surface (i.e., the hollow portion 154h) of the second elastic member 154.

The other end surface 154f of the second elastic member 154 abuts against an end surface 106c of the end closing member 106.

The end closing member 106 has a hollow portion 106a, an annular O-ring groove 106d for mounting an O-ring 113 for sealing the gap between the end closing member 106 and a large-diameter hole 101f formed at the open end of the cylinder body 101, an outward projecting portion 106f projecting from an end surface 106e exposed to the outside, and a communication hole 106g formed in the outward projecting portion 106f so as to make the communication between the hollow portion 106a and the outside. Reference numeral 115 denotes a stop ring for preventing the disengagement of the end closing member 106 from the large-diameter hole 101f.

FIG. 2B is an enlarged sectional view showing the first elastic member 153 and the recess 161 of the second elastic member 154. Reference symbol θ1 denotes the angle of inclination of an external tapering surface 153a as the outer circumferential surface of the first elastic member 153 with respect to the axis 102h of the piston 102, and reference symbol θ2 denotes the angle of inclination of an internal tapering surface 154c as the inner circumferential surface of the recess 161 of the second elastic member 154 with respect to the axis 102h of the piston 102. The relation between θ1 and θ2 is θ1<θ2.

The reason for the tapering cylindrical shape of the first elastic member 153 is as follows: if the first elastic member 153 is an elastic member having a simple cylindrical shape without taper, an elastic reaction force of this elastic member when compressively deformed is linearly increased with an increase in piston stroke. To the contrary, in the case of the first elastic member 153 having the tapering cylindrical shape according to the present invention, an elastic reaction force of the first elastic member 153 when compressively deformed can be easily nonlinearly increased with an increase in piston stroke. Accordingly, it is possible to increase design flexibility in play operation feel on the brake lever 21 (see FIG. 1) and the brake pedal 22 (see FIG. 1).

The inner circumferential surface 154c of the recess 161 of the second elastic member 154 is also tapered toward the end closing member 106 like the taper of the first elastic member 153, so as to accommodate a part of the first elastic member 153. Furthermore, the relation of θ1<θ2 is satisfied. Accordingly, when the piston 102 is moved to compressively deform the first elastic member 153, a space can be easily formed between the first elastic member 153 and the inner circumferential surface 154c of the second elastic member 154, so that excessive compressive deformation of the first elastic member 153 can be prevented to thereby improve the durability of the first elastic member 153.

Reference symbol D1 denotes the outer diameter of the small-diameter portion 102a. Reference symbol D2 denotes the outer diameter of the first elastic member 153 at its one end. Reference symbol D3 denotes the inner diameter of the inner circumferential surface 154c of the recess 161 at its one end. Reference symbol C4 denotes the clearance between the inner circumferential surface of the first elastic member 153 at its one end and the outer circumferential surface of the small-diameter portion 102a. Reference symbol C5 denotes the clearance between the inner circumferential surface 154c of the recess 161 at its one end and the external tapering surface 153a of the first elastic member 153 at its one end.

Figure 3:
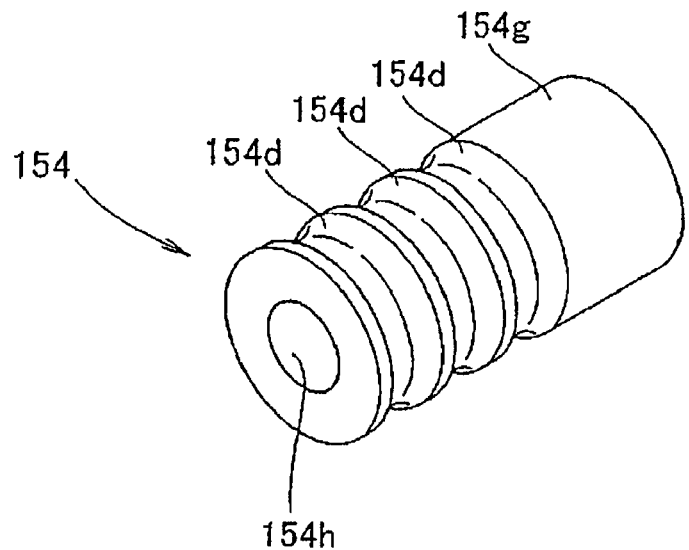
FIG. 3 is a perspective view of a second elastic member according to the present invention.

FIG. 3 is a perspective view of the second elastic member 154 according to an embodiment of the present invention. As shown in FIG. 3, the plural annular recesses 154d are formed on the outer circumferential surface 154g so as to be arranged at equal intervals in the axial direction of the second elastic member 154.

The second elastic member 154 is formed of rubber (EPDM) or resin, and has a Shore hardness Hs of 90.

Figure 4:
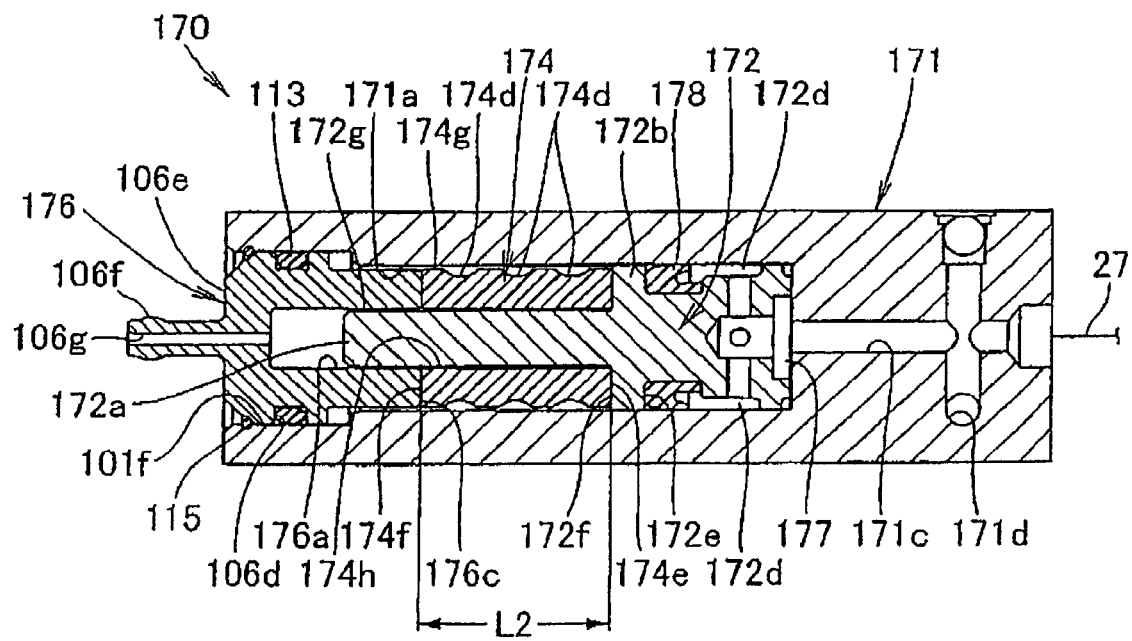
FIG. 4 is a sectional view of a stroke simulator for a rear wheel brake system according to the present invention.

FIG. 4 is a sectional view of the stroke simulator for the rear wheel brake system according to an embodiment of the present invention. In FIG. 4, the same parts as those of the stroke simulator 28 for the front wheel brake system shown in FIGS. 2A and 2B are denoted by the same reference numerals and the detailed description thereof will be omitted.

The stroke simulator 170 for the rear wheel brake system 12 includes a cylinder body 171 having a cylinder hole 171a, a piston 172 movably inserted in the cylinder hole 171a and having a small-diameter portion 172a, an elastic member 174 loosely engaged with the small-diameter portion 172a and loosely inserted in the cylinder hole 171a, and an end closing member 176 for closing one end of the cylinder hole 171a, the end closing member 176 having a hollow portion 176a for movably accommodating the small-diameter portion 172a.

The cylinder body 171 is formed with a brake fluid passage 171c having one end connected to the brake pipe 27 and the other end communicating with the cylinder hole 171a. The cylinder body 171 is further formed with a relief passage 171d for relieving extra brake fluid in filling the cylinder hole 171a with a brake fluid.

The piston 172 is composed of a large-diameter portion 172b slidably fitted to the cylinder hole 171a and a small-diameter portion 172a formed integrally with the large-diameter portion 172b at its one end. The outer circumferential surface of the large-diameter portion 172b is formed with a plurality of axial grooves 172d extending in the axial direction of the piston 172 and communicating with a fluid chamber 177 defined between one end of the cylinder hole 171a and one end of the piston 172. The outer circumferential surface of the large-diameter portion 172b is further formed with an annular groove 172e for mounting a sealing member 178 for sealing the gap between the cylinder hole 171a and the large-diameter portion 172b.

The elastic member 174 is interposed between the piston 172 and the end closing member 176. The elastic member 174 has an outer circumferential surface 174g formed with a plurality of annular recesses 174d. The elastic member 174 is further formed with a hollow portion 174h for insertion of the small-diameter portion 172a.

One end surface 174e of the elastic member 174 abuts against an end surface 172f of the large-diameter portion 172b, and the other end surface 174f of the elastic member 174 abuts against an end surface 176c of the end closing member 176.

Although not shown, the clearance corresponding to the clearance C2 shown in FIG. 2A is defined between the outer circumferential surface 174g of the elastic member 174 and the cylinder hole 171a, and the clearance corresponding to the clearance C3 shown in FIG. 2A is defined between the outer circumferential surface 172g of the small-diameter portion 172a and the hollow portion 174h of the elastic member 174.

The elastic member 174 has an outer diameter and an inner diameter respectively equal to the outer diameter and the inner diameter of the second elastic member 154 (see FIGS. 2A and 2B). Further, the elastic member 174 has an overall length L2 smaller than the overall length L1 of the second elastic member 154 for the stroke simulator 28 shown in FIGS. 2A and 2B (i.e., L2<L1).

The reason for this setting, L2<L1, is that a hard operation feel is desired in operating the brake pedal 22 of the rear wheel brake system 12 as compared with the operation feel in operating the brake lever 21 of the front wheel brake system 11. Accordingly, by reducing the overall length L2 of the elastic member 174 for the stroke simulator 170 as compared with the overall length L1 of the second elastic member 154 for the stroke simulator 28, the spring constant of the elastic member 174 is increased over the spring constant of the second elastic member 154.

Further, the reason for eliminating the first elastic member 153 having a small spring constant of the stroke simulator 28 (see FIGS. 2A and 2B) from the stroke simulator 170 is that the brake pedal 22 is operated by the operator's foot and a play as in operating the brake lever 21 is not comparatively obtrusive in operating the brake pedal 22. Accordingly, the operation feel in operating the brake pedal 22 need not be so minutely set.

The operation of the brake system 10 mentioned above will now be described.

Figure 5:
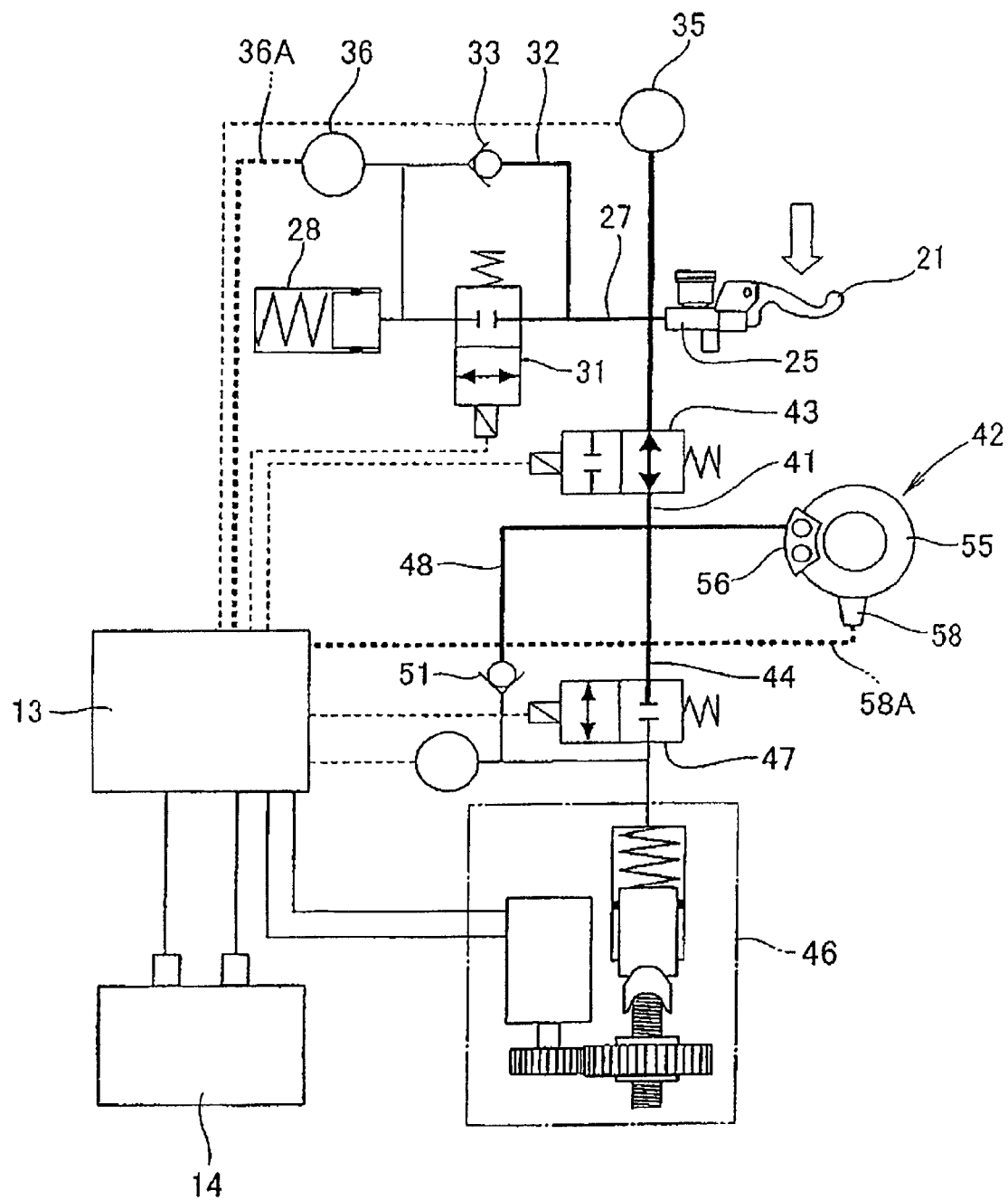
FIG. 5 is a schematic diagram showing a first stage of the operation of the brake system according to the present invention.

FIG. 5 is a schematic diagram showing a first stage of the operation of the brake system according to an embodiment of the present invention. In FIG. 5 and the following drawings, the thick lines show a brake fluid pressure generating part, a signal flowing part, and a current supplied part in the brake system. The operation of the front wheel brake system 11 is substantially the same as that of the rear wheel brake system 12, so that the operation of the front wheel brake system 11 will mainly be described.

When an ignition switch in the vehicle is OFF (e.g., when the vehicle is stationary or it is being driven by the operator) or when the ignition switch is ON and the front wheel speed detected by the front wheel speed sensor 58 is zero or less than a predetermined value (i.e., the control unit 13 determines that the vehicle is stationary), the first electromagnetic valve 31 is in a closed condition, the second electromagnetic valve 43 is in an open condition, and the third electromagnetic valve 47 is in a closed condition. Accordingly, by operating the brake lever 21 as shown by a hollow arrow in FIG. 5, a fluid pressure is generated in the front wheel master cylinder 25 and this fluid pressure is transmitted through the passages shown by the thick lines. The conductors 36A and 58A shown by the thick lines correspond to the case that the ignition switch is ON.

The fluid pressure generated in the front wheel master cylinder 25 is transmitted to the brake caliper 56 of the front wheel disc brake device 42, so that the brake disc 55 is braked by the brake caliper 56 to thereby brake the front wheel. Thus, the front wheel can be manually braked.

The reason for generating a fluid pressure by operating the brake lever 21 to manually brake the front wheel when the stationary condition of the vehicle is determined in a by-wire system is as follows: if a fluid pressure is generated by the power unit 46 to brake the front wheel, a burden is placed on the power unit 46 which causes an increase in power consumption. Accordingly, the manual braking of the front brake mentioned above is performed to reduce this burden on the power unit 46, thereby suppressing the power consumption.

Figure 6:
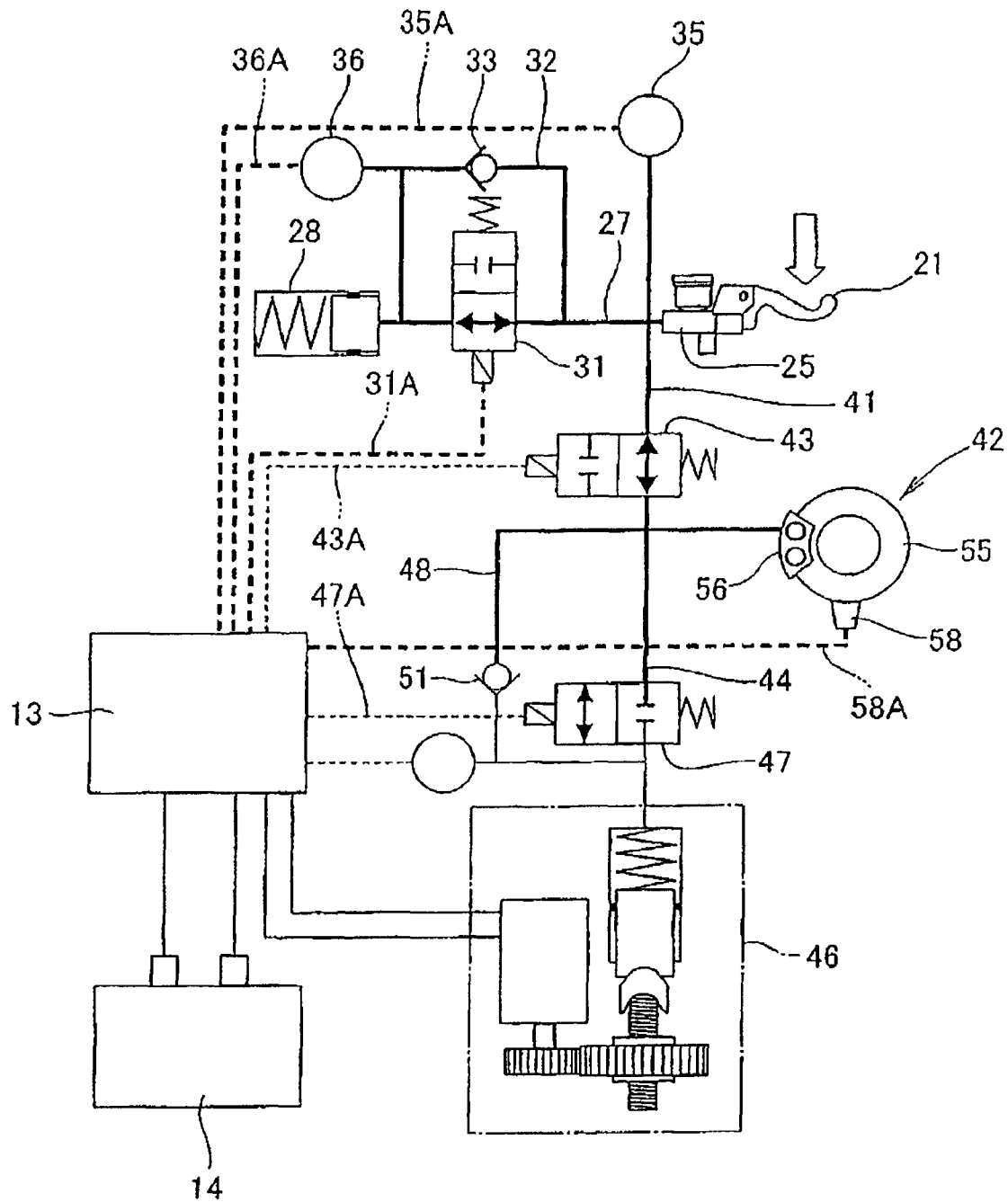
FIG. 6 is a schematic diagram showing a second stage of the operation of the brake system according to the present invention.

FIG. 6 is a schematic diagram showing a second stage of the operation of the brake system according to an embodiment of the present invention.

When the vehicle starts running and the front wheel speed detected by the front wheel speed sensor 58 exceeds the predetermined value mentioned above, a front wheel speed signal is output from the front wheel speed sensor 58 through the conductor 58A to the control unit 13. Then, the control unit 13 sends a valve opening signal to the first electromagnetic valve 31 according to the above front wheel speed signal. As a result, the first electromagnetic valve 31 is opened to make the communication between the front wheel master cylinder 25 and the stroke simulator 28.

By operating the brake lever 21 in this condition as shown by a hollow arrow in FIG. 6, a fluid pressure is generated in the front wheel master cylinder 25 and this fluid pressure is transmitted to the brake caliper 56 of the front wheel disc brake device 42 to brake the front wheel. The fluid pressure in the stroke simulator 28 is detected by the second pressure sensor 36, and a pressure signal is output from the second pressure sensor 36 through the conductor 36A to the control unit 13.

Figure 7:
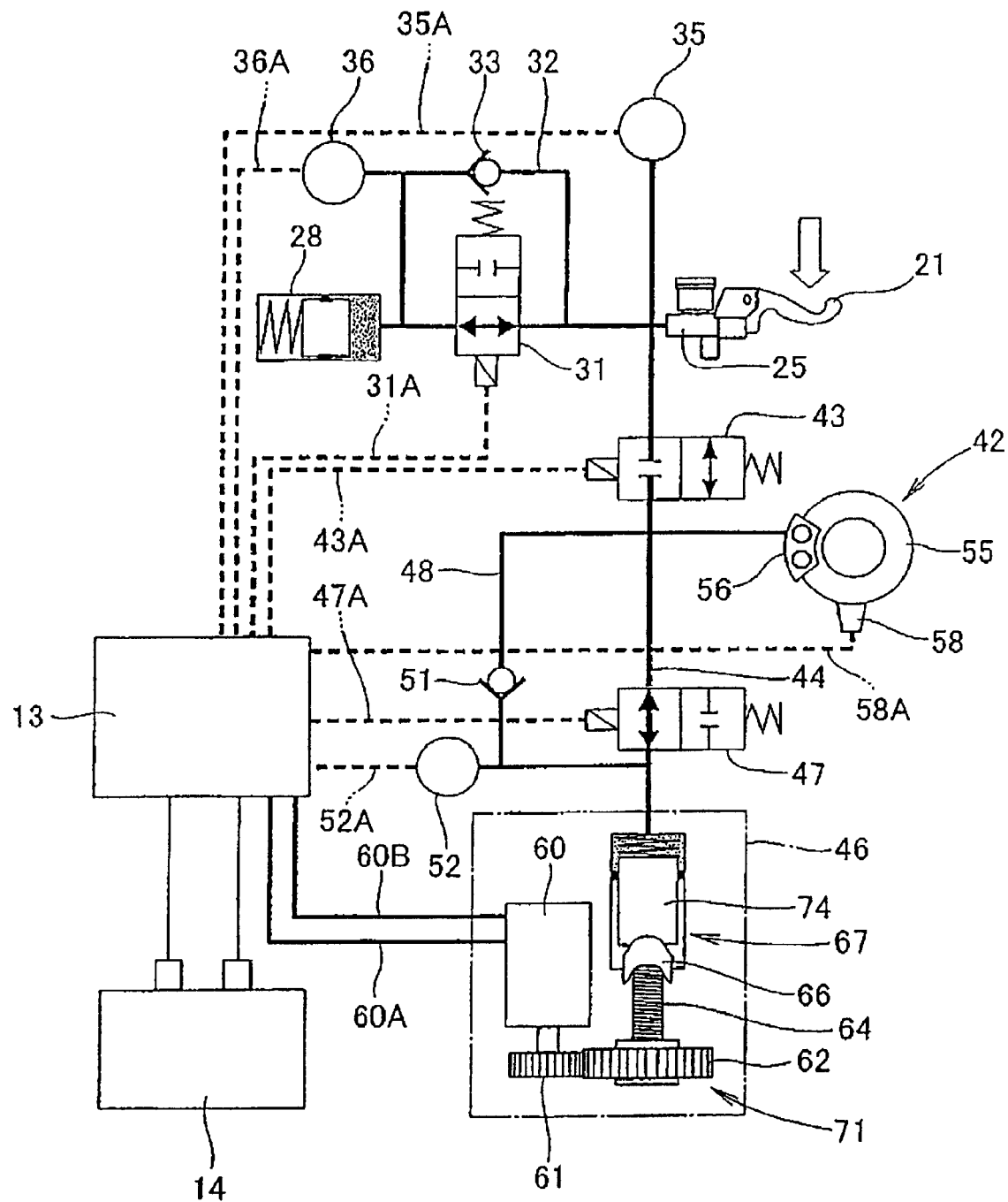
FIG. 7 is a schematic diagram showing a third stage of the operation of the brake system according to the present invention.

FIG. 7 is a schematic diagram showing a third stage of the operation of the brake system according to an embodiment of the present invention.

When the fluid pressure detected by the second pressure sensor 36 after operating the brake lever 21 in FIG. 6 becomes not less than a predetermined value, the stroke simulator 28 starts operating as shown in FIG. 7. Further, a valve closing signal is sent from the control unit 13 to the second electromagnetic valve 43, and a valve opening signal is sent from the control unit 13 to the third electromagnetic valve 47 according to the pressure signal from the second pressure sensor 36.

As a result, the second electromagnetic valve 43 is closed to disconnect the front wheel disc brake device 42 from the front wheel master cylinder 25. At the same time, the third electromagnetic valve 47 is opened to connect the front wheel disc brake device 42 to the power unit 46.

Further, a current is supplied from a motor driving section (not shown) provided in the control unit 13 to the electric motor 60. As a result, the electric motor 60 starts operating to move the power piston 74, thereby generating a fluid pressure in the power cylinder device 67. This fluid pressure is transmitted to the brake caliper 56 of the front wheel disc brake device 42, thereby braking the front wheel. Thus, braking of the front wheel by the by-wire system is performed. During this course of operation, the stroke simulator 28 continues to operate.

The braking operation for the rear wheel by the rear wheel brake system 12 shown in FIG. 1 is performed automatically in concert with the braking operation for the front wheel by the front wheel brake system 11 according to an input pressure to the front wheel brake system 11, i.e., according to a brake fluid pressure detected by the second pressure sensor 36. The operation of the rear wheel brake system 12 is similar to that of the front wheel brake system 11.

Conversely, the braking operation by the front wheel brake system 11 is performed automatically in concert with the braking operation by the rear wheel brake system 12 according to an input pressure to the rear wheel brake system 12, i.e., according to a brake fluid pressure detected by the second pressure sensor 36 (see FIG. 1) in the rear wheel brake system 12.

FIGS. 8A to 8D are sectional views showing the operation of the stroke simulator 28 according to an embodiment of the present invention. The operation of the stroke simulator 28 shown in FIG. 7 will now be described in more detail with reference to FIGS. 8A to 8D.

Figure 8A:
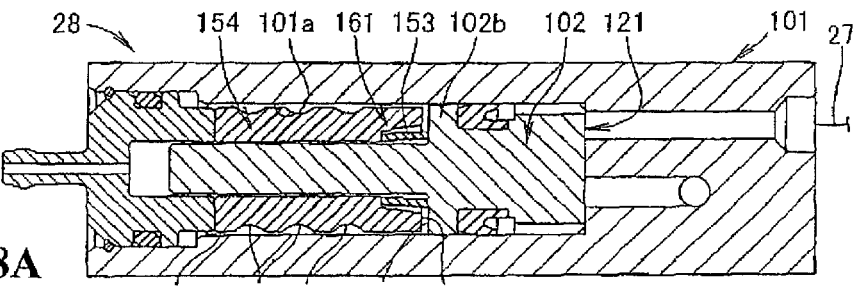
FIGS. 8A to 8D are sectional views showing the operation of the stroke simulator according to the present invention.

FIG. 8A shows a condition where no fluid pressure is transmitted from the front wheel master cylinder 25 (see FIG. 1) to the cylinder hole 101a of the stroke simulator 28.

Figure 8B:
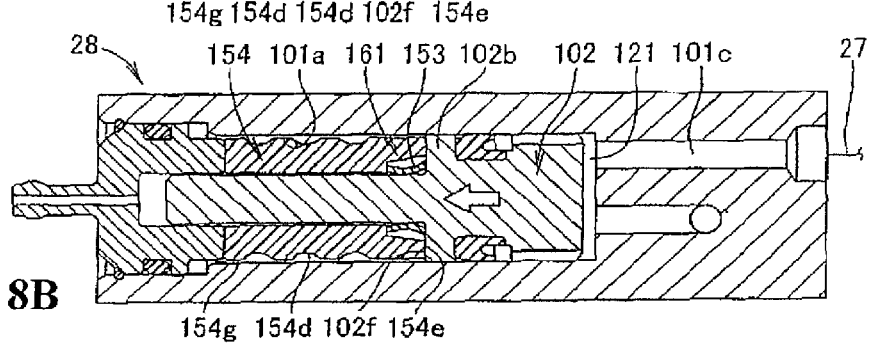

FIG. 8B shows a condition where a fluid pressure is transmitted from the front wheel master cylinder 25 (see FIG. 1) to the fluid chamber 121 defined between one end of the cylinder hole 101a of the cylinder body 101 and one end of the piston 102. When the fluid pressure in the fluid chamber 121 is increased to move the piston 102 in the cylinder hole 101a as shown by a hollow arrow in FIG. 8B, the first elastic member 153 having a spring constant smaller than that of the second elastic member 154 is compressed to be deformed convexly in the radially inward direction of the first elastic member 153. Finally, the end surface 102f of the large-diameter portion 102b of the piston 102 abuts against the end surface 154e of the second elastic member 154.

As a result, the whole of the first elastic member 153 is accommodated in the recess 161 and thereafter the compressive deformation of the first elastic member 153 is suppressed. That is, a space is left around the first elastic member 153 in the recess 161 in the condition shown in FIG. 8B. Accordingly, the amount of compressive deformation of the first elastic member 153 or stress generated in the first elastic member 153 can be easily suppressed to thereby ensure the durability of the first elastic member 153.

During the compressive deformation of the first elastic member 153 as mentioned above, the front wheel master cylinder 25 is disconnected from the front wheel disc brake device 42 as shown in FIG. 7. However, a play operation feel can be given to the brake lever 21 as in the case that the front wheel disc brake device 42 is operated by a fluid pressure generated by operating the brake lever 21.

Figure 8C:
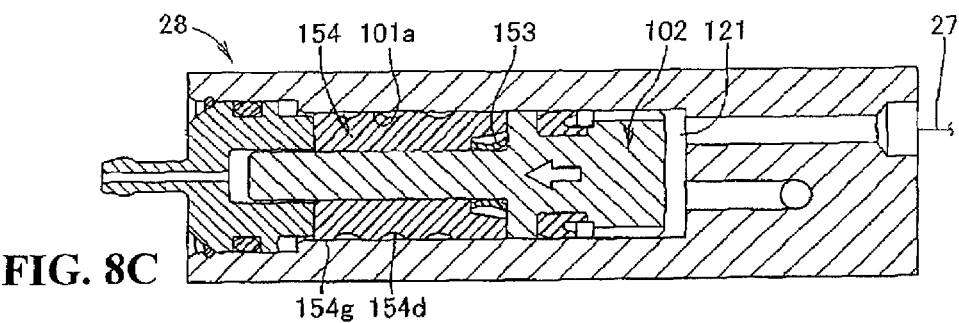

FIG. 8C shows a condition where the piston 102 is further moved leftward as shown by a hollow arrow in FIG. 8C to thereby compressively deform the second elastic member 154. Accordingly, the clearance between the second elastic member 154 and the cylinder hole 101a becomes almost zero. That is, the clearance C2 shown in FIG. 2A becomes almost zero.

Also during this compressive deformation of the second elastic member 154, an operation feel can be given to the brake lever 21 as in the case that the front wheel disc brake device 42 is operated by a fluid pressure generated by operating the brake lever 21.

Figure 8D:
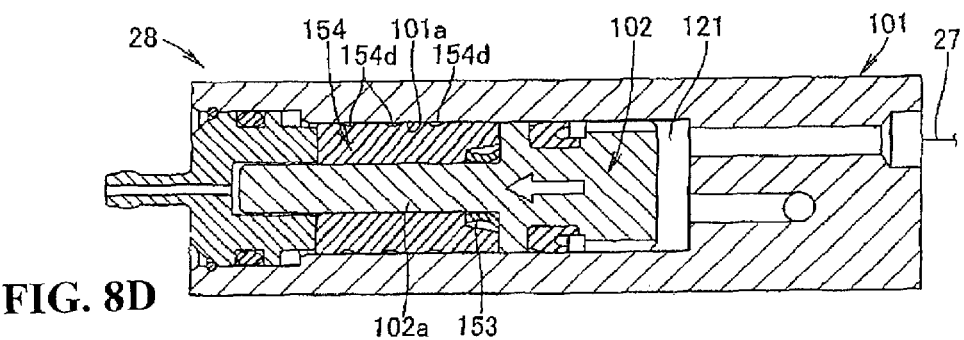

FIG. 8D shows a condition where the piston 102 is further moved leftward as shown by a hollow arrow in FIG. 8D to further compressively deform the second elastic member 154.

That is, the second elastic member 154 is compressively deformed in such a manner that the sectional area of each annular recess 154d of the second elastic member 154 is reduced, i.e., the inner surface of each annular recess 154d is deformed in the radially outward direction of the second elastic member 154. Accordingly, as compared with the case that no annular recesses are formed on the outer circumferential surface of the second elastic member, the spring constant is not rapidly increased. That is, although the second elastic member 154 is in contact with the cylinder hole 101a during the compressive deformation shown in FIG. 8D, the piston 102 can be easily moved. Accordingly, the operation feel on the brake lever 21 can be made moderately hard and the stroke of the brake lever 21 can also be ensured.

According to this embodiment as shown in FIGS. 1 to 3, there is provided the stroke simulator 28 in the brake system 10 including the cylinder body 101, the piston 102 movably inserted in the cylinder body 101, and the second elastic member 154 as an elastic member adapted to be pressed by the piston 102, and functioning to give a simulative operation feel to the brake lever 21 as a brake operation member by operating the brake lever 21 to generate a fluid pressure in the front wheel master cylinder 25 as a master cylinder and transmit this fluid pressure to the cylinder body 101, thereby deforming the second elastic member 154 through the piston 102, wherein the annular recesses 154d as an outer circumferential recess are formed on the outer circumferential surface 154g of the second elastic member 154. With this arrangement, the second elastic member 154 is pressed by the piston 102 to increase in diameter in the cylinder body 101, so that the outer circumferential surface of the second elastic member 154 comes into contact with the cylinder hole 101a as the inner circumferential surface of the cylinder body 101 to thereby increase the spring constant of the second elastic member 154. Furthermore, the inner surface of each annular recess 154d is deformed in the radially outward direction of the second elastic member 154 to thereby allow a further movement of the piston 102, resulting in an increase in stroke of the brake lever 21. Accordingly, the operation feel on the brake lever 21 can be made moderately hard and the stroke of the brake lever 21 can also be ensured.

The outer circumferential recess is provided by the annular recesses 154d annularly formed on the outer circumferential surface 154g of the second elastic member 154. Accordingly, the second elastic member 154 can be deformed uniformly in the circumferential direction thereof, so that the stroke characteristic of the second elastic member 154 can be made more stable.

The second elastic member 154 has a hollow cylindrical shape. The piston 102 includes the large-diameter portion 102b slidably fitted to the cylinder hole 101a of the cylinder body 101 and the small-diameter portion 102a formed adjacent to the large-diameter portion 102b. The small-diameter portion 102a is inserted in the hollow portion 154h of the second elastic member 154. One end of the second elastic member 154 opposed to the piston 102 is formed with the annular shoulder portion 154a on the inner circumferential surface, thereby forming the recess 161 as an end recess between the annular shoulder portion 154a and the outer circumferential surface 102g of the small-diameter portion 102a of the piston 102. The first elastic member 153 as a compact elastic member having a spring constant smaller than that of the second elastic member 154 is accommodated in the recess 161. The annular recesses 154d are formed on the outer circumferential surface 154g of the second elastic member 154 except a part thereof corresponding to the radially outside area of the recess 161. Thus, the annular recesses 154d are not formed around the recess 161, so that the deformation of the first elastic member 153 is not influenced by the annular recesses 154d. Accordingly, the operation feel on the brake lever 21 can be set more minutely, thereby obtaining a desirable operational feel on the brake lever 21.

The clearance C3 is defined between the small-diameter portion 102a of the piston 102 and the hollow portion 154h of the second elastic member 154. With this arrangement, in inputting an operational force to the brake lever 21 and thereafter removing this operational force from the brake lever 21, the piston 102 can be easily separated from the second elastic member 154 owing to the clearance C3 defined between the piston 102 and the second elastic member 154. That is, the piston 102 can be easily returned to its initial position. Accordingly, the piston 102 can quickly respond to the next input to the brake lever 21.

Figure 9A:
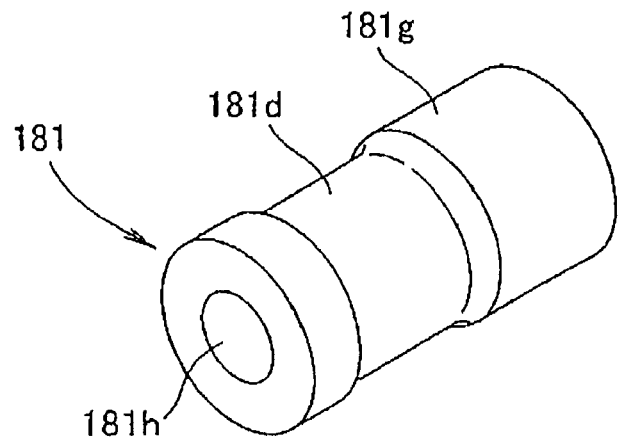
FIGS. 9A to 9C are perspective views showing various modifications of the second elastic member according to the present invention.
Figure 9B:
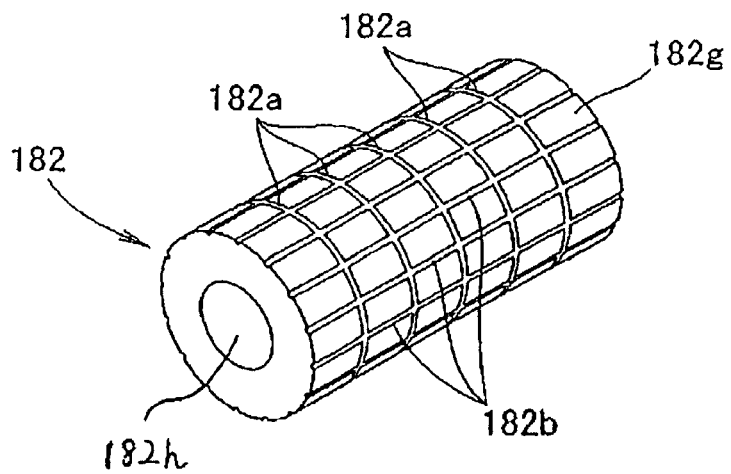
Figure 9C:
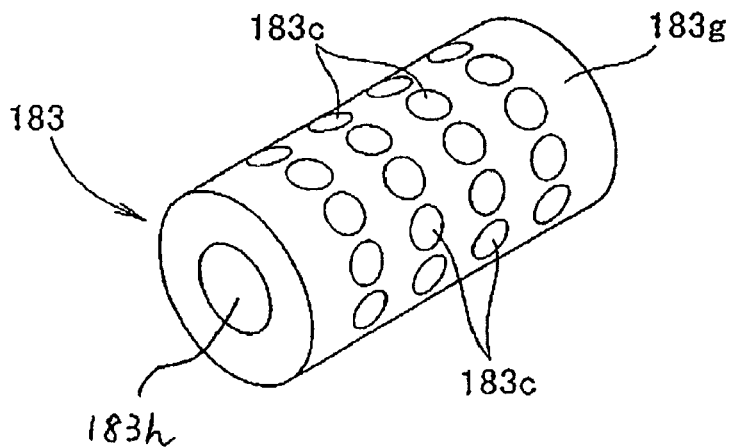

FIGS. 9A to 9C are perspective views showing various modifications of the second elastic member according to an embodiment of the present invention.

FIG. 9A shows a second elastic member 181 formed of rubber (EPDM) or resin. The second elastic member 181 has an outer circumferential surface 181g formed with a single wide annular recess 181d. Reference numeral 181h denotes a hollow portion.

FIG. 9B shows a second elastic member 182 formed of rubber (EPDM) or resin. The second elastic member 182 has an outer circumferential surface 182g formed with a plurality of annular grooves 182a extending in the circumferential direction and a plurality of axial grooves 182b extending in the axial direction.

The plurality of annular grooves 182a are arranged at equal intervals in the axial direction, and the plurality of axial grooves 182b are arranged at equal intervals in the circumferential direction. Reference numeral 182h denotes a hollow portion.

FIG. 9C shows a second elastic member 183 formed of rubber (EPDM) or resin. The second elastic member 183 has an outer circumferential surface 183g formed with a plurality of dimples 183c.

The plurality of dimples 183c are arranged at equal intervals both in the axial direction and in the circumferential direction. Reference numeral 183h denotes a hollow portion.

The plurality of dimples 183c may be arranged in zigzag on the outer circumferential surface 183g.

While the annular recesses 154d are formed on the outer circumferential surface 154g of the second elastic member 154 as shown in FIGS. 2 and 3 in this embodiment, the hollow portion 154h of the second elastic member 154 may be formed with a plurality of annular recesses. Further, the plurality of annular recesses 154d may be replaced by a single spiral groove.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A stroke simulator in a brake system, comprising:
a cylinder body,
a piston movably inserted in said cylinder body,
a first elastic member and a second elastic member; wherein
the first elastic member has a spring constant smaller than that of said second elastic member;
wherein the second elastic member is adapted to be pressed by said piston, such that a simulative operation feel is given to a brake operation member by operating said brake operation member to generate a fluid pressure in a master cylinder and transmit this fluid pressure to said cylinder body, thereby deforming said elastic member through said piston, wherein an outer circumferential surface of said elastic member has an outer circumferential recess; and
wherein said first elastic member is located inside an annular opening of said second elastic member.

2. The stroke simulator in the brake system according to claim 1, wherein said outer circumferential recess is annular.

3. The stroke simulator in the brake system according to claim 2, wherein:
said elastic member has a hollow cylindrical shape;
said piston includes a large-diameter portion slidably fitted to the inner surface of said cylinder body and a small-diameter portion formed adjacent to said large-diameter portion;
said small-diameter portion is disposed in a hollow portion of said elastic member;
one end of said elastic member opposed to said piston has an annular shoulder portion on the inner circumferential surface, thereby forming an end recess between said annular shoulder portion and the outer circumferential surface of said small-diameter portion of said piston; and
said outer circumferential recess is formed on the outer circumferential surface of said elastic member except for a part thereof which corresponds to an area radially outside of said end recess.

4. The stroke simulator in a brake system according to claim 3, wherein a clearance is defined between said small-diameter portion of said piston and said hollow portion of said elastic member.

5. The stroke simulator in a brake system according to claim 2, wherein a clearance is defined between said small-diameter portion of said piston and said hollow portion of said elastic member.

6. The stroke simulator in the brake system according to claim 1, wherein:
said elastic member has a hollow cylindrical shape;
said piston includes a large-diameter portion slidably fitted to the inner surface of said cylinder body and a small-diameter portion formed adjacent to said large-diameter portion;
said small-diameter portion is disposed in a hollow portion of said elastic member;
one end of said elastic member opposed to said piston has an annular shoulder portion on the inner circumferential surface, thereby forming an end recess between said annular shoulder portion and the outer circumferential surface of said small-diameter portion of said piston; and
said outer circumferential recess is formed on the outer circumferential surface of said elastic member except for a part thereof which corresponds to an area radially outside of said end recess.

7. The stroke simulator in a brake system according to claim 6, wherein a clearance is defined between said small-diameter portion of said piston and said hollow portion of said elastic member.

8. The stroke simulator in the brake system according to claim 1, wherein said second elastic member includes a shoulder portion on an end facing the piston, wherein no said outer circumferential recesses are located.

9. The stroke simulator in the brake system according to claim 8, wherein said second elastic member has an angled annular opening with respect to an outer surface of said first elastic member.

10. The stroke simulator in a brake system according to claim 1, wherein a clearance is defined between said small-diameter portion of said piston and said hollow portion of said elastic member.

11. The stroke simulator in the brake system according to claim 1, wherein a gap exists between said first elastic member and said second elastic member.

12. The stroke simulator in the brake system according to claim 1, wherein said first elastic member extends beyond the second elastic member in a direction of a length of the piston.

* * * * *